United States Patent [19]

Paton et al.

[11] 3,961,582
[45] June 8, 1976

[54] ARTICULATED RAILCAR

[76] Inventors: Hamilton Neil King Paton, 2521 W. Montlake Place E., Seattle, Wash. 98112; John B. Skilling, 3000 Webster Pt. Road NE., Seattle, Wash. 98105

[22] Filed: Apr. 3, 1974

[21] Appl. No.: 457,422

Related U.S. Application Data

[63] Continuation-in-part of Ser. No. 353,371, April 23, 1973, abandoned, which is a continuation of Ser. No. 189,379, Oct. 14, 1971, abandoned.

[52] U.S. Cl. .................................. 105/3; 105/4 R; 105/165; 105/167; 105/176; 105/206 R; 267/3; 280/81 B; 308/137; 308/239; 308/240
[51] Int. Cl.² ..................... B61F 3/00; B61F 5/14; B61F 5/18; B61F 5/30
[58] Field of Search ............ 105/4 R, 159, 165, 167, 105/168, 176, 182 R, 197 R, 198, 199 R, 199 S, 206 R, 3, 224 A, 224.1; 267/63 A, 63 R, 3; 280/81, 81 B; 308/137, 138, 225, 226, 239, 240

[56] References Cited
UNITED STATES PATENTS

| 123,999 | 2/1872 | King | 267/63 R |
|---|---|---|---|
| 136,079 | 2/1873 | Magowan | 267/63 R |
| 538,858 | 5/1895 | Adams | 105/199 R X |
| 621,826 | 3/1899 | Kling | 105/199 R X |
| 682,406 | 9/1901 | Fassett | 308/226 |
| 701,416 | 6/1902 | Susemihl et al. | 308/226 |
| 710,609 | 10/1902 | Pungs | 308/226 X |
| 710,673 | 10/1902 | Fassett | 308/226 |
| 717,304 | 12/1902 | Wands | 105/197 R |
| 1,020,276 | 3/1912 | Gambrel | 105/199 S |
| 1,038,481 | 9/1912 | Blake | 105/198 |
| 1,142,379 | 6/1915 | Stevenson | 105/165 |
| 2,034,504 | 3/1936 | Bugatti | 105/199 R |
| 2,058,955 | 10/1936 | Culemeyer | 280/81 |
| 2,115,095 | 4/1938 | Bugatti | 105/4 R |
| 2,150,896 | 3/1939 | Muchnic | 105/199 R |
| 2,154,586 | 4/1939 | Stern | 267/63 R |
| 2,166,858 | 7/1939 | Bugatti | 105/182 R |
| 2,907,283 | 10/1959 | Markestein et al. | 105/182 R |
| 2,917,005 | 12/1959 | Furrer et al. | 105/199 S X |
| 2,996,018 | 8/1961 | Aspenberg | 105/3 |
| 3,020,857 | 2/1962 | Dean | 105/199 R |
| 3,181,479 | 5/1965 | Rumsey et al. | 105/197 R X |
| 3,338,183 | 8/1967 | Boissier | 105/206 R X |
| 3,350,146 | 10/1967 | Williams | 308/138 |
| 3,394,662 | 7/1968 | Weber | 105/165 |
| 3,451,355 | 6/1969 | Dobson et al. | 105/199 R X |
| 3,528,374 | 9/1970 | Wickens | 105/4 R X |
| 3,570,409 | 3/1971 | Oelkers | 105/199 R X |
| R5,452 | 6/1873 | Higley | 105/224.1 |

FOREIGN PATENTS OR APPLICATIONS

| 754,382 | 1/1954 | Germany | 105/176 |
|---|---|---|---|
| 555,188 | 8/1943 | United Kingdom | 105/165 |

*Primary Examiner*—Robert J. Spar
*Assistant Examiner*—Howard Beltran
*Attorney, Agent, or Firm*—Dowrey & Cross

[57] ABSTRACT

A railcar unit includes a pair of railcars, each having a car body supported by single-axle, forward and rearward trucks which are pivotally mounted to the car bodies. Conventional drawbars couple the car bodies and independent, interconnectable members connect the trucks of the adjacent railcars for rotational and longitudinal relative movement while maintaining the truck axles in parallel alignment.

14 Claims, 30 Drawing Figures

ARTICULATED RAILCAR

CROSS-REFERENCE TO RELATED APPLICATIONS

This application is a continuation-in-part of my co-pending application, Ser. No. 353,371, filed Apr. 23, 1973 now abandoned, and entitled "Railway Car Truck and Mounting Structure," which, in turn, is a continuation of application Ser. No. 189,379, filed Oct. 14, 1971, now abandoned and entitled "Railway Car Truck and Mounting Structure." The details of said applications are incorporated herein by reference thereto.

BACKGROUND OF THE INVENTION

1. Field of the Invention

This invention pertains to railcar units and, more particularly, to interconnected single axle railcar truck units.

2. Background of the Invention

Presently designed long freight cars, such as auto parts boxcars, special flatcars, etc., create problems in transit due to several factors. One is that, when relatively lightweight long cars (many as long as 89 feet 4 inches) are coupled empty behind the locomotive in a long string of other, heavier cars, the lightweight long cars will tend to form a chord across any substantial track curvatures when the train is starting up. As a result, this loading can actually pull a whole string of such long cars off the track on the inside of the curve in an attempt to establish a straight line between the engine and the nearest connecting conventional or loaded heavier car. A second problem with long cars is that harmonic vertical accelerations can occur in both the car body and cargo because of the span length between car trucks.

In attempting to reduce the problems caused by long individual car lengths, various alternative designs to articulate have been attempted. One such technique is to connect the forward end of one car and the rearward end of the next adjacent car to a single double-axle truck. A disadvantage with this concept is that the cars thus do not have four wheels per vehicle when disconnected from the common truck. As a result, a separate, specialized vehicle is necessary to push or pull the car along the track during the train make-up and for servicing purposes.

Other prior art types of railcars have used a fixed, single axle on either end of the car, while others, such as that shown in U.S. Pat. No. 2,058,955, have telescopically but fixed, interconnected trucks to vary the length of the car itself.

In addition, two primary desired requirements of railway car trucks are that they have a suspension system which can accommodate variations in load due to different types of lading, for example, lightweight, easily damaged fruits vs. heavier frozen foods, and that there be sufficient damping to provide dynamic stability to the truck and car body. Still another desired requirement is that, during static loading, 40% of the static load is carried by the unloaded wheel of the truck or combined trucks. This requirement, of course, reduces the chance of a wheel's lifting off the track and resulting in a turnover.

Little basic change has taken place in the principles of railroad freight car truck design since the late 1800's. The vehicles which ride on these trucks have changed radically, as have the vehicle load-carrying requirements and operating speeds. To meet the rapidly increasing demands for higher capacity and greater speed, truck designers merely scaled up. When a problem developed in one component, that component would be beefed up or some ancillary device would be added. Subsequently, problems were not solved but, rather were chased from one component to another throughout the system.

Since elastic deformations of both rail and wheel, in contact with one another, are relatively small, rail joints, track gage and cross-level, and other rail conditions, all dynamically affect the wheels, axles and bearings as well as the dependent truck superstructure and suspension, carbody, and finally — but most importantly — the responsive lading in the car. The problems that the railroads are currently encountering in operation of freight cars with current track conditions and existing equipment are: rock-and-roll which is a resonant rolling mode induced by staggered rail joints being encountered alternately by the wheels on either side of the truck at low speed; high speed hunting which is an oscillation induced by the tendency of a wheel to re-center developing into a resonant lateral chatter during high speed operation; and the inability of standard truck design to control random motions which results in multiplication of forces developed during resonance.

A standard truck consists of 4 wheels, fixed in pairs on axles. The axles are fitted on the ends with roller bearings and are held substantially parallel by a pair of side frames. The side frames are fixed loosely by way of an adapter and a keeper to the roller bearing. Each side frame is a rigid truss member which spans between the axles and has an opening at its center called a spring pocket. This spring pocket contains a group of springs which support a bolster member. The bolster is a rigid transverse member which spans between the side frames, passing through the spring pockets, and is supported at its ends by the spring groups. At the center of the bolster is a center bowl. The center bowl supports the weight of the car by means of a mating centerplate which is affixed to the understructure of the car. The car is thereby supported on 2 points; one at each end of the car which gives a tendency to rock to one side or the other. The tendency of the car to rock is resisted by two side bearings, located on either side of the center bowl. Each side bearing is set with a clearance so that the carbody is not in contact unless it rocks to one side.

The axles are fixed to the wheels and the wheels, therefore, must rotate at the same speed. The wheels are tapered so that they tend to center themselves or so that when they ride up on a curve, the outer wheel can move to a larger radius allowing the wheels to remain traveling at the same speed. The bearings are press-fitted to the ends of the axles and are clamped into the end of the side frames by way of an adapter and keeper. The adapter is shaped so that the axle can rotate relative to the side frame in a horizontal plane without wracking or eccentrically loading the bearing. it is also set with a clearance so that it is allowed to move laterally in the opening. The keeper is not in contact with the bearing, but is placed so that the bearing cannot fall out. The relationship between the side frame and the bolster is approximately the same. The bolster is allowed to rotate relative to the side frame and to move laterally in the spring pocket and is engaged by a stop at the extreme position. These relative clearances and motions are allowed with the design purpose of preventing excessive twisting or wracking stresses in the bearing, the side frame, and the bolster end during operation. Unfortunately, to allow motion is to allow wear and to allow motion with the forces of the magnitude encountered by or developed by a railroad car, is to allow extremely high-impact forces and dynamic forces to develop.

The classes of devices presented as solutions to existing truck problems range from mechanical and hydraulic spring snubbers to constant contact side bearings and other truck-to-car body supportive arrangements. In every operating situation currently in the U.S., Canada and Mexico truck suspension elements include steel coil springs. Ancillary devices offered to control harmonic and other problems caused by use of steel coil springs include: steel volute springs (snubbers); hydraulic snubbers: steel friction snubbers. Each of these devices produces some special side effect that results in increased wear, maintenance, stress levels, fatigue, damage and cost. The same holds true for so-called constant-contact side bearings and truck bolster—body bolster devices which directly affect the members they are affixed or contact as well as other, non-directly related parts of the entire system.

For example, a recent truck hunting investigation made by the Seaboard Coast Line and the Pullman-Standard Division of Pullman Incorporated, one a major railroad and the other a major railroad car building company, describes standard 3-piece truck frames as oscillating with respect to the carbody in a parallelogram motion with displacement in the magnitude of one inch as being common throughout the test between carbody and truck sideframe. The centerplate bowl of the carbody and truck bolster oscillated with respect to the carbody in the translational as well as a swivel motion. Vertical and lateral accelerations of the two side frames were cyclical. Longitudinal accelerations were out of phase with respect to each other. Centerplate wear resulted in maximum centerplate longitudinal movement measured between carbody and truck bolster of 0.8 inches at 50 and 55 mph., indicating accelerated wear taking place during truck hunting.

In a conventional truck, in addition to the wheel axles, bearings and adapters, the side frames (which are the majority of the truck weight) are unsprung. The greater the weight of unsprung items the greater the magnitude of forces that are transferred into the car body for a given rail input. Friction damping in conventional trucks is created by two pieces of steel which rub together.

Furthermore, the majority of the damping (when there are attempts made to solve dynamic problems) is obtained by hydraulic devices which are supplementary to the basic truck system. These hydraulic devices have the problem of being proportional to the velocity of motion rather than being proportional to the load in the car and, consequently, in a lightly loaded car where high frequency motion obtains, the damping becomes excessive and the forces transmitted to lading in the car became excessive.

Conventional trucks cannot adequately accommodate track twists found in track in service today and also maintain an adequate static load on the unloaded wheel. Without adequate loading, the unloaded wheel can easily climb the rail. Constant contact side bearings in conventional trucks further complicate the truck accommodation to the track twist problem because these side bearings require a certain amount of force to depress them.

Numerous attempts have been made to alleviate some of the foregoing problems by complicated, expensive and generally inadequate truck constructions, such as sprung, constant contact side bearings. The railroad industries of the United States and abroad have found these various alternative truck constructions to be too costly, heavy and largely ineffectual, being "after-the-fact" attempted cures not generally in use today. Typical of these attempts is the railcar illustrated in U.S. Pat. No. 3,570,409, which employs an extremely rigid bolster 28, with weight-supporting bearings placed laterally outwardly from the center pin, and that of the U.S. Pat. No. 3,181,479, which shows a bolster mounted in side frames by rubber pads loaded in shear and compression with elaborate stabilizing rods to prevent relative longitudinal truck frame movement.

Other patents illustrate systems to dampen the dynamic loading, such as with hydraulic or steel friction plate damping mechanisms. The extent of hydraulic damping is directly proportional to velocity of movement of the fluid rather than to the weight of the load, resulting in excessive damping and thus causing the forces transmitted to the car to damage fragile lading. Damping through two pieces of steel rubbing together provides a constant damping force which, like a similar system shown in U.S. Pat. No. 3,020,857, is only responsive to a slight degree to the load in the car.

SUMMARY OF THE INVENTION

It is an object of this invention to provide a railcar unit which forms an interconnected, double-axle truck from two independent, rotatable (about a vertical axis), single-axle trucks.

It is an another object of this invention to provide an interconnected railcar unit which provides shorter articulated car lengths.

It is another object of this invention to provide a railcar unit which has good stability characteristics and does not transmit damaging shocks to the lading.

It is another object of this invention to provide an interconnected railcar unit which is relatively inexpensive to manufacture and maintain.

It is another object of this invention to provide an interconnectable railcar unit capable of separation and safe operation singly at low running speeds, due to wheel flange guidance alone.

It is another object of this invention to provide an interconnectable railcar unit capable of sustaining automatic, longitudinal foreshortening or lengthening of the distance between two independent, horizontally rotatable, sprung and damped railcar trucks.

It is another object of this invention to provide a pair of independent, horizontally rotatable railcar trucks supporting adjacent ends of two railcar bodies and which are capable of entering a toggle condition and arrangement wherein the distance between the points of rotation for each adjacent railcar body on the trucks varies when traversing curved track.

It is another object of this invention to provide an interconnection for single-axle trucks composed of two elongated, cylindrical, slidable, rotatable, non-fixed, telescopic, stiff members.

These objects are best obtained by providing a railcar unit including a pair of railcars, each including two single-axle trucks respectively supporting adjacent ends of two car bodies. Drawbar or coupling means couple the car bodies independently of the pivotally mounted trucks. The trucks are independently interconnected by means which allow automatic rotational and longitudinal relative movement while maintaining their axles in parallel alignment. This allows the spacing between the interconnected trucks to vary and enables the interconnected trucks to tilt or "walk" relative to each other so that each of the load-carrying wheels of the two adjoining trucks carries a substantial portion of its share of the load.

In particular, the preferred embodiment provides a reduction in the effects of the various reaction forces resulting from the aforementioned track conditions by a unique combination of features which cooperate with one another to support the varying loads of railway car lading and dampen dynamic force reactions throughout the truck and its connection with the railway car body.

The truck of this invention provides a damped action throughout its range of interconnecting points between the carbody and the track. This assures an improved ability to reduce truck hunting. The truck suspension includes a unique elastomeric suspension system which has self-damping capabilities in two directions to further reduce truck hunting.

By damping out harmonic forces, the truck's tendency to oscillate from side to side on tangent (straight) track can be reduced to non-critical levels for greater safety, as well as reduced maintenance and replacement costs. By greatly reducing vertical acceleration of the sprung mass of the truck and of the carbody and lading, damage becomes controllable and its almost total elimination can be foreseen.

The truck of the invention does not economically penalize the advantages it offers. Both weight and cost estimates on a present-day basis of comparison indicate an extremely favorable and competitive production cost feasibility. The truck uses conventional brake systems, roller bearings and standard wheels and axles. Also, design based on the truck 4 point support system promises valuable construction cost reduction and more efficient carbody design.

Rubber (natural, modified for maximum longevity) has been well proven over many years for both primary and secondary suspensions in rail and road vehicles, both domestically and abroad. Rubber is also the best known vibration reducing material due to its inherent (if small) damping qualities vs. steel springs which give virtually total vibration transmissibility. Also during severe excursions, rubber spring members cannot "bottom out" as can steel suspension springs — nor can rubber elements break, as steel springs do. The use of rubber suspensions in transportation vehicles of almost all classes have been hampered by one major drawback, and that is the lack of sufficient inherent damping to satisfy all the loading conditions.

Ths suspension system of this invention of rubber elements and special friction damping means in conjunction with the special adapter units provides a wide variety of possibilities as to design for varying ranges of load requirements. An example would be where a refrigerator car carries light loads of highly perishable and easily damaged fruit products, such as pears, peaches, etc., but on return trips may be carrying heavy frozen foods or canned goods. Our suspension system provides a soft ride with definite lading damage reduction capabilities vs. any form of standard steel spring system or existing elastomeric system without relying upon expensive, high-maintenance hydraulic shock absorbers in conjunction with their use.

In order to accommodate track twist on the order of 1 inch in 150 inches which, for a 43-foot truck center car with what might be considered to be an infinitely stiff body, such as a covered hopper car or tank car, unless conventional side bearings are used which have an air gap of approximately ⅜inch when the car is on a level track, it is not possible with any other system to comply with such a track twist and still retain approximately 40% of the car weight on the track on the light loaded wheels of the car/trucks.

Attempts currently in the U.S. to introduce so-called constant contact side bearings defeat this purpose by eliminating the air gap which, in combination with the standard steel coil springs which produce a linear spring curve can cause wheel lift under far less stringent conditions than the 1 inch in 150 inches requirement as set forth by European and British railway systems for safety purposes.

The truck of this invention is able to meet this requirement by reason of the total combination of compliant members and suspension elements previously discussed. Because the truck is based on an elastically rigid system, it is possible to rationally analyze it. A standard truck with all loose members is not possible to analyze rationally. Irrespective of the improvements in reducing lading damage, carbody damage and truck component damage inherent in the truck system of this invention, it is necessary to consider the public safety aspect and the reduced potential of derailment offered by this truck over conventional trucks offered for articulated usage.

An invention of this application provides a reduction in the effects of the various reaction forces resulting from the aforementioned track conditions by a unique combination of features which cooperate with one another to support the varying loads of railway car lading and dampen dynamic reactions throughout the truck and its connection with the railway car body. This combination of elements essentially comprises cylindrical elastomeric rod spring arrangements coupled with a compliant damping mechanism, a distribution of lateral springing over various elements of the truck including a center pin spring to accept significant lateral movement, and omni-directional load carrying side bearings. Damping is carried out primarily through the spring and damping mechanism with additional inherent damping occurring at the side bearing and lateral springs.

All forces acting on the wheel bearings are symmetrical around the actual center of the axle of the truck reducing undesirable moments that would otherwise increase wear and change the entire system loading characteristic. The spring and damping system allows the car body to carry lightweight easily damaged lading, such as fruit, with a soft spring at initial loading and increasingly becomes a very hard spring at the point of overturning or bump in severe dynamic conditions such as maximum rock-and-roll condition. The compliant damping system results in an increase in the amount of friction damping substantially proportional to the increase in load so that with a heavily loaded car there is significantly more damping than for a lightly loaded car. The springs are located between the axles and the side frame thus advantageously reducing the unsprung mass of the truck. Providing a very stiff bolster in its longitudinal direction makes it stiff in the tramming direction and highly stiff in the parallelogramming direction. By providing this stiffness, a significant increase in bearing life occurs due to the fact that both parallelogramming and tramming will be greatly reduced and thus racking forces on the axle bearings will be greatly reduced.

The center spring provides both a sprung and a damped rotational movement (about a vertical axis through the truck center) with no vertical load transmitted to the truck through the center pin. The friction damped compliance of the spring at the center pin helps to reduce rock-and-roll motion by allowing cushioned motion between the car body and the truck reducing the critical dynamic lateral forces transmitted between the railway car body and the truck.

Omni-directional side bearings provide additional longitudinal, lateral and rotational friction damping between the rail car and the truck coupled with the additional inherent damping of the center spring. Each side bearing includes two lateral surfaces one of which is planar. The side bearings allow free longitudinal and rotational movement between the railway car body and the truck and provide the sole vertical load carrying connection between the car body and truck. The side bearings also provide freedom of motion about their centroids to maintain full contact of their planar surface in contact with the mating car surface. This is particularly important in avoidance of high localized stress concentrations in the side bearings and mating car body surfaces. The side bearings are located close to the side sills of the car thus reducing bending moments in the railway car body bolsters and allowing the side sills to carry almost the entire vertical load. The side bearings are vertically incompressible relative to the side frames and provide an increase in friction damping proportional to the increase in load in the car body. The side bearings are kept in constant contact when in the use by the car body weight and the main load carrying springs.

One of the prime advantages found from the suspension system of this invention is its low unsprung mass has reduced vertical acceleration in the railway car body and thus in the lading which will greatly reduce car truck damage, body structure damage, and lading damage.

BRIEF DESCRIPTION OF THE FIGURES OF THE DRAWING

FIG. 11 is an enlarged longitudinal section, whereas FIG. 12 is an enlarged transverse section of the side bearing.

FIG. 13B is a section of a second modified side bearing.

FIG. 13C is a bottom view of the floating central bearing member of the bearing of FIG. 13B.

DETAILED DESCRIPTION OF THE DRAWINGS

FIGS. 1–7 illustrate two single-axle truck units combined for a particular application of interconnected railcar units. The unique, interconnected railcars are best illustrated by the schematic operational view of FIGS. 6 and 7 and comprise semi-permanently interconnected vehicles, each having a four-point suspension system while utilizing single axles able to swivel relative to the car body.

Figure 4:
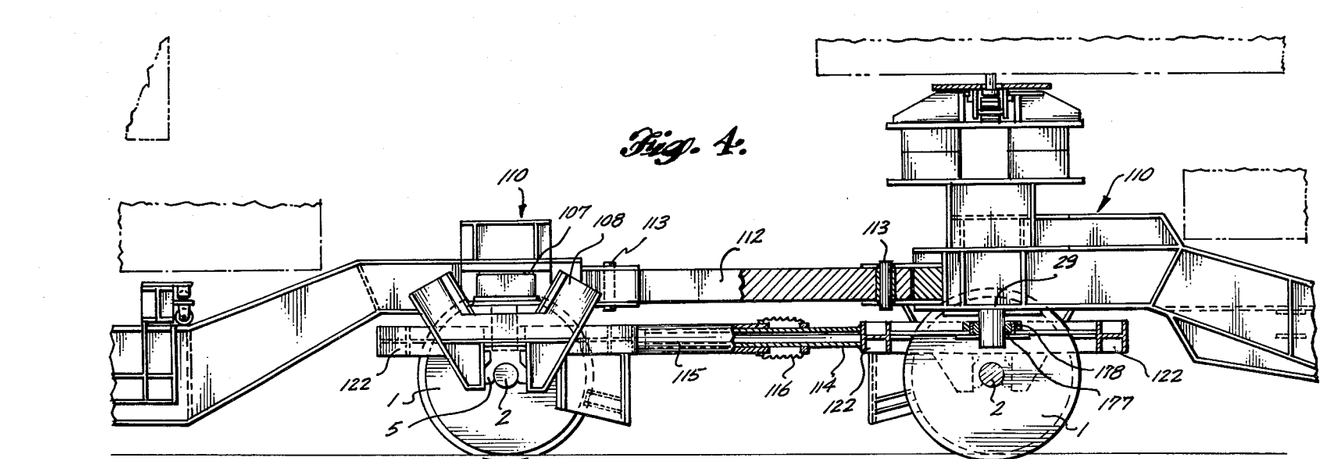
FIG. 4 is another form of truck, similar to that shown in FIGS. 1–3 and embodying some of the principles of the invention.
Figure 5:
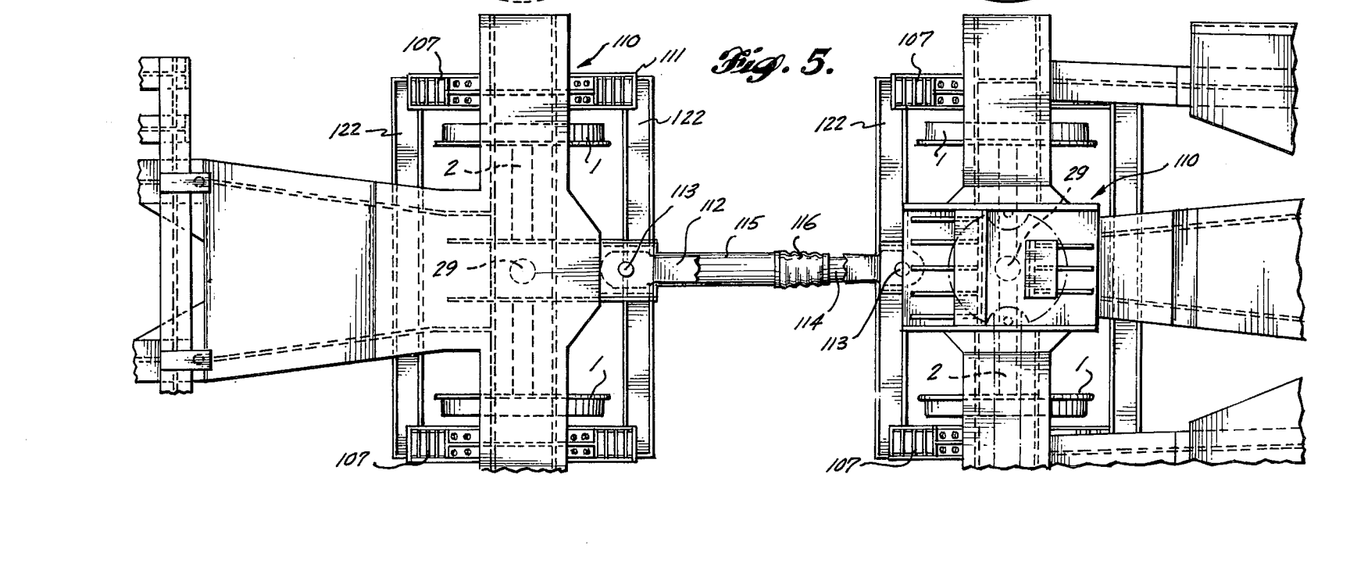
FIG. 5 is a plan of the truck shown in FIG. 4.

A low-profile railcar body 110 is of the drop-center beam type particularly adapted to transport large objects, such as semi-trailers and containers. In the embodiment of FIGS. 4 and 5, the load of such objects is transmitted to the truck side frames 11 by anti-friction bearing devices 107 and shock absorbing load supports 108. FIGS. 4 and 5 show two such truck units forming opposite ends of adjacent railcars connected together. A drawbar 112 is connected between the car body structures 110 by pivots 113 having upright axes. Such a drawbar 112 will transmit pushing and pulling forces between the car bodies in the conventional manner will enable the car bodies to swing relative to each other. It is desired, however, to connect the adjacent truck units (not the car bodies) so that they cannot swing relative to each other. Because the pivots 113 are not located in vertical alignment with the axles 2 of the trucks, the truck bodies 110 will move toward and away from each other to some extent as they swing relatively in the manner indicated in FIGS. 6 and 7.

Although is is desirable to prevent the truck units from swinging relative to each other when telescopically connected, it is also desirable to enable the truck units to tilt relatively about a horizontal, longitudinal axis in order to enable the load of the cars to be distributed uniformly to the four wheels of the two trucks. Consequently, in addition to the car bodies 110 being connected together by the drawbar 112 as described above, the trucks are held in the desired relationship by the telescopic inter-engagement of two longitudinal members 114 and 115. Each of these members has one end rigidly secured to a truck frame, and the other end telescopically inter-engaged for relative low-friction, longitudinal and rotational movement as shown in FIGS. 6 and 7.

Figure 6:
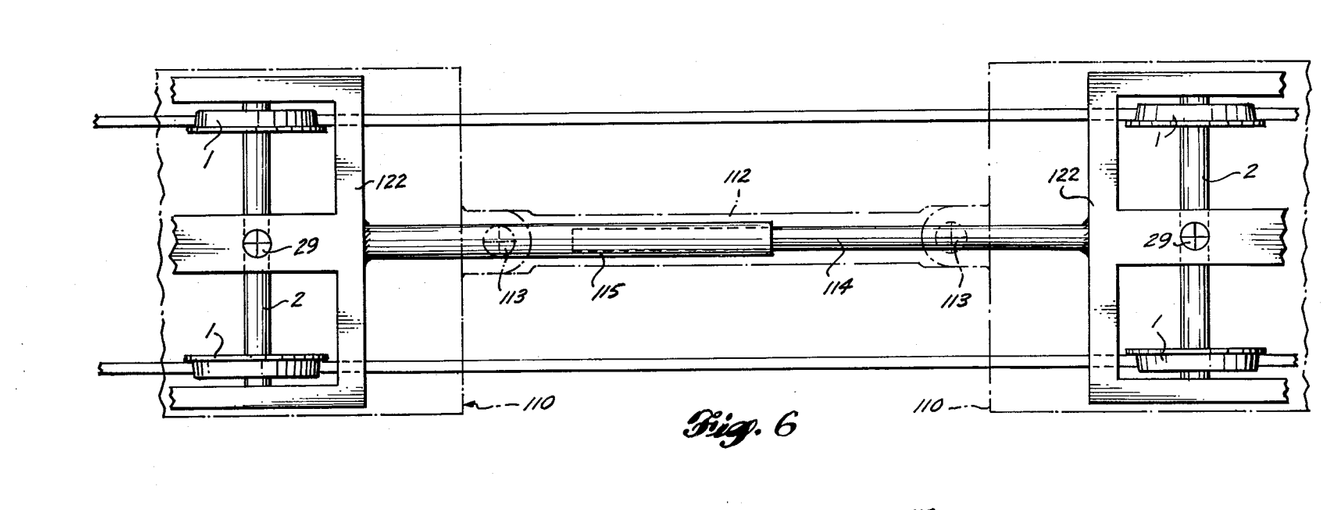
FIG. 6 is a schematic operational view of the trucks shown in FIGS. 1–5.
Figure 7:
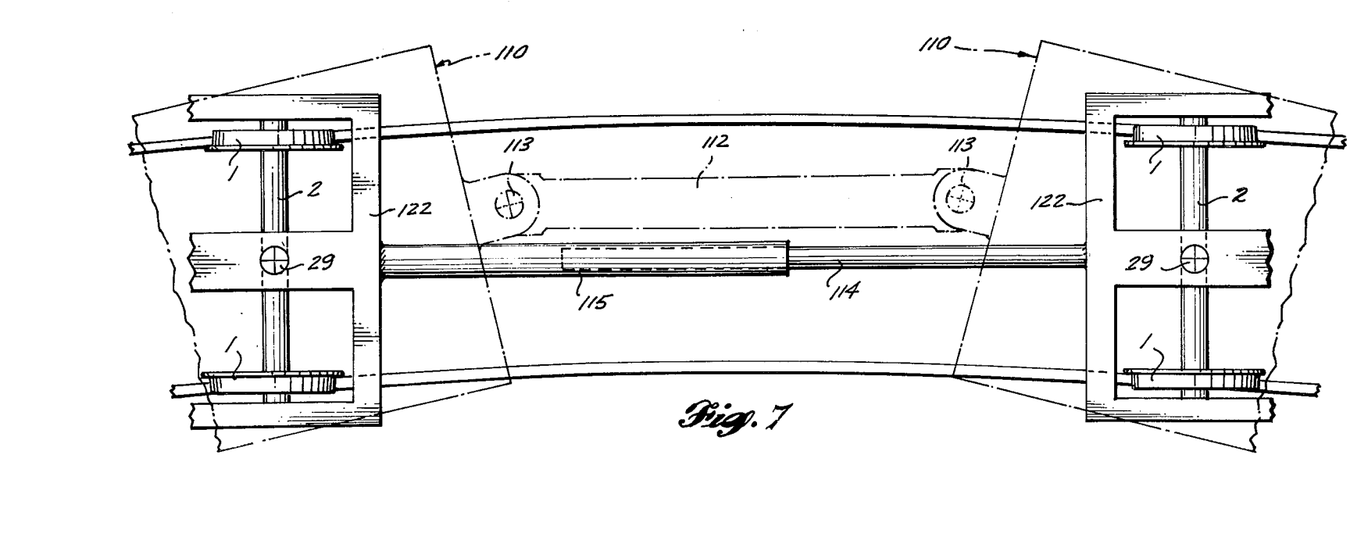
FIG. 7 is a second operational position of the trucks shown in FIGS. 1–5.

The telescopic connection of members 114 and 115 will enable the spacing between the truck frames to be altered when the car bodies swing relatively to them, as indicated by a comparison of their relative relationships shown in FIGS. 6 and 7. The members 114 and 115 are also relatively rotatable, at least to a degree sufficient to enable the trucks to tilt or walk to effect equal load distribution on the wheels, while the interconnection of the trucks prevents relative swinging of the truck frames.

To facilitate relative reciprocation and rotation of telescopic members 114 and 115, suitable provisions may be made for supplying lubricants between these parts. Dirt can be prevented from getting into the space between telescopic parts by covering the entrance to the bore of the outer part 115 by a flexible boot 116 (FIGS. 1 and 4) which has sufficient flexibility to avoid exerting a force on the members 114 and and thus the boot will not deter relative reciprocation or rotation. minimum minimum It should be understood that relative rotational movement of members 114 and 115 can also be accomplished by rotatably mounting one of the members in a bearing on its respective truck. In such a case, the telescopic members could be rectangular or of another relatively non-rotatable configuration. Also, one or more of the telescopic members could be pivotally mounted (for example, see FIG. 2A) for providing vertical swinging movement of the telescopic members relative to one of the trucks.

Holding the truck frames against relative swinging in this manner does not deter relative swinging of the car bodies for negotiating curves in the track, however, because each body is guided for both tilting and swinging relative to the frames of its supporting truck. In one embodiment, as shown in FIG. 4, a ball element 117 is mounted in the central portion of the truck frame by a socket member 118. A side thrust connector or pin 19 extends through a central aperture in the ball element 117. The upper end of said connector is secured rigidly to a car body 110. While the pin or side thrust connector prevents relative horizontal movement between the railcar body and the truck, such a connector cannot transmit vertical loads from the car body to the truck because the connector is slidable vertically through the ball element 117.

Figure 1:
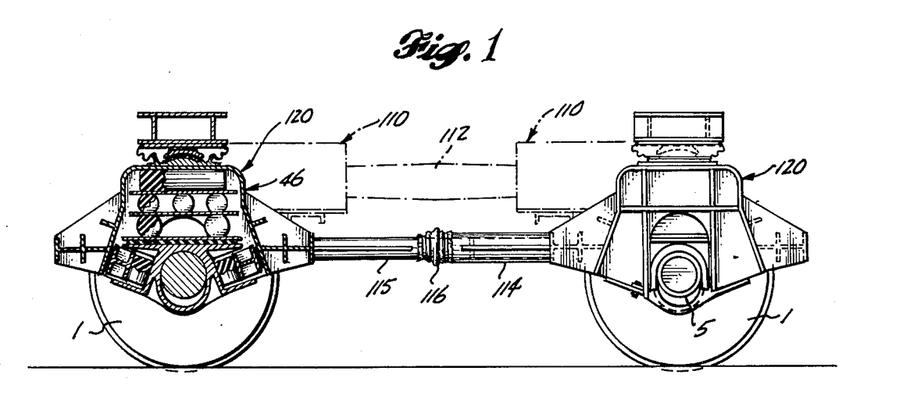
FIG. 1 is a side elevation, partly sectioned, of a modified form of truck.
Figure 2:
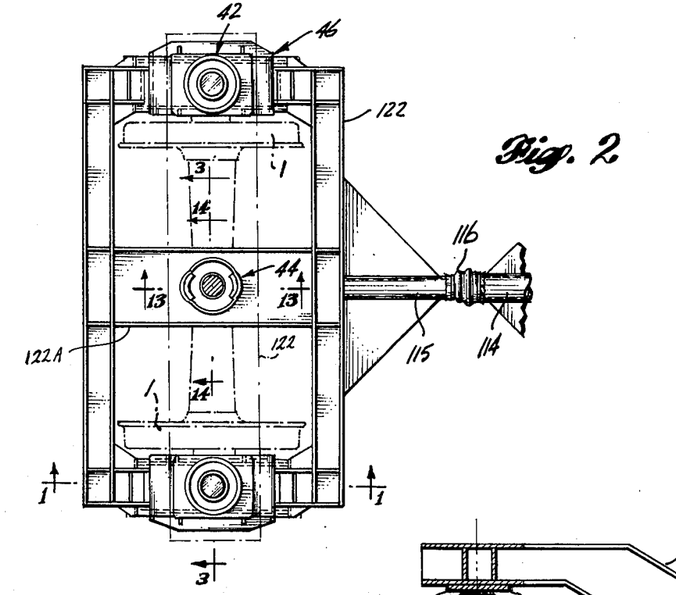
FIG. 2 is a plan view of the truck shown in FIG. 1.
Figure 2A:
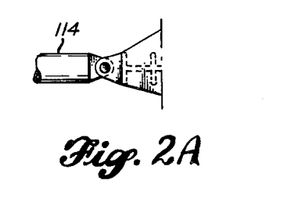
FIG. 2A is a fragmentary side elevation detail of a modified embodiment.
Figure 3:
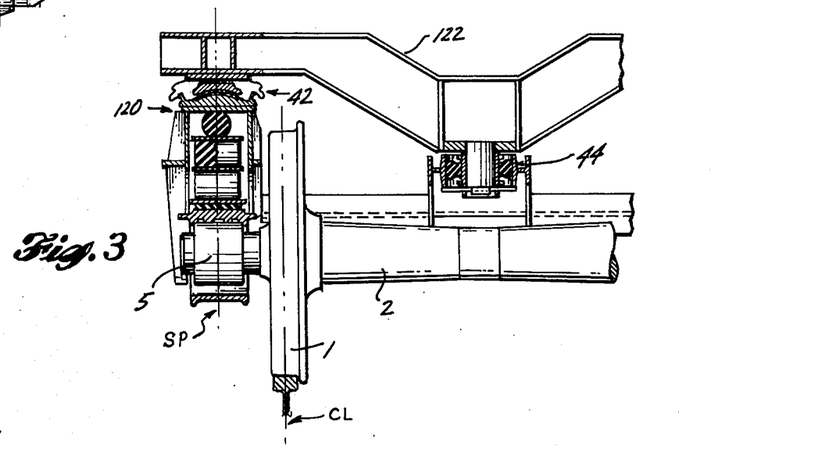
FIG. 3 is a transverse fragmentary vertical section of the truck shown in FIG. 1.

FIGS. 1–3 illustrate an improved single axle truck. The truck has side frames 120, each of which carries a damped springing system, to be described.

The railway car body includes a body bolster 122. The body bolster is supported on each side by an omni-directional bearing 42 which also provides the majority of the damping for a center pin spring mechanism 44 which provides compliance at the center pin 27 of the body bolster while the spring and damping suspension system 46 suspends the side frame on the single axle 2.

The side bearings 42 provide omni-directional, low friction, high strength vertically incompressible load bearing support for the ends of the body bolster 7 (FIG. 8) directly upon the respective side frames 40. The side bearings 42 of this invention are best shown in FIGS. 8–12 and 13A–13C of the drawings. The side bearing of FIG. 8–12 comprises a lower bearing member or casting 52 which is fixed to the top of the side frame 40, a floating central bearing member or casting 58, and an upper bearing member or plate 61 which is fixed to the underside of the body bolster 7. The central and lower bearing members are maintained in continuous load bearing contact with each other by spring clip means, presently to be described, and by the weight of the car body on the truck.

Figures 8, 9, 10, 13A:
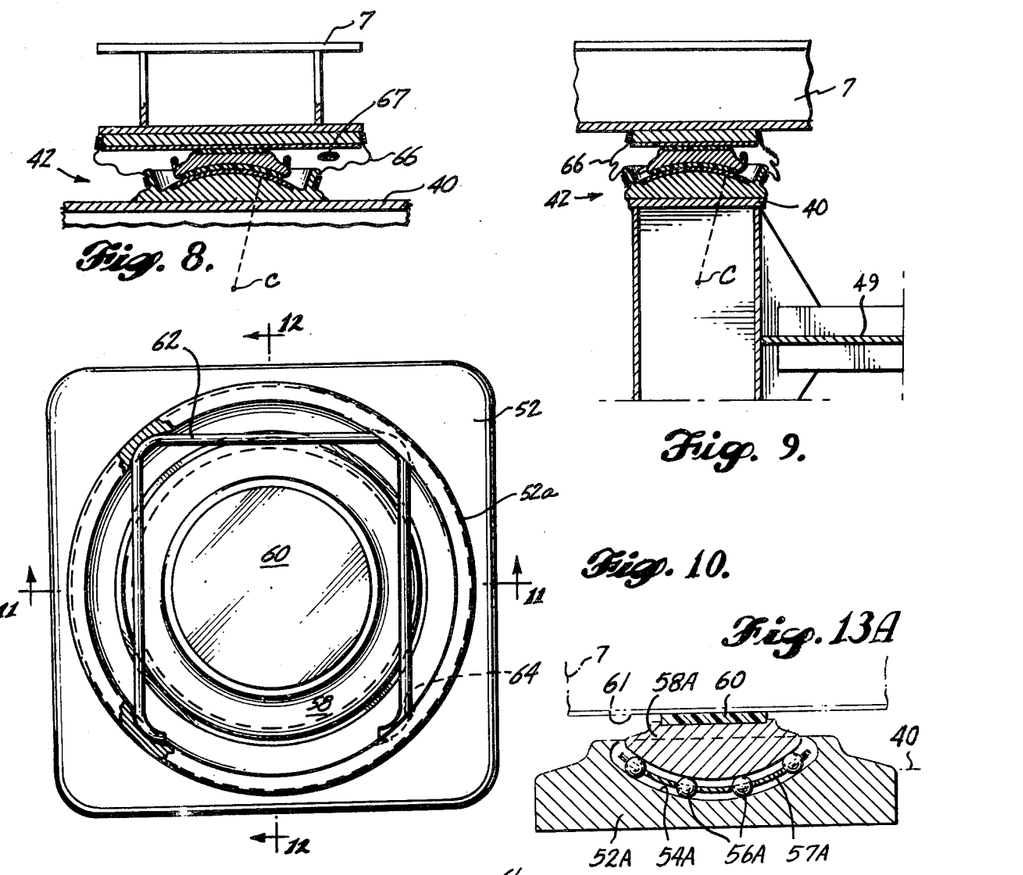
FIG. 8 is a longitudinal section of one of the side bearings shown in FIG. 1.
FIG. 9 is a transverse section taken through the side bearing shown in FIG. 8.
FIG. 10 is a plan of the bearing shown in FIG. 8.
FIG. 13A is a section of a first modified side bearing.

The lower bearing member 52 includes an upstanding peripheral flange 52a and a domed midsection of generally hemispherical cross-sectional configuration. The domed midsection includes a recess 54 in which is secured a polished or smooth metal plate 57, also of generally hemispherical cross-sectional configuration. The floating central bearing member 58 has a concave lower surface. A concave anti-friction composite disc 56 is fastened to the concave lower surface of the floating central bearing member 58 and bears against and mates with the domed midsection of the lower bearing member 52, as shown. The disc 56 has a concave lower surface of generally hemispherical cross-sectional configuration generally similar to that of the lower bearing member domed midsection and of substantially the same radius from common centroid C (FIGS. 8 and 9). The composite disc 56 is fabricated of low friction material, which preferably has a coefficient of friction from .02–.10 and most preferably about .04. The floating central bearing member 57 further includes an upper surface having a recess 59 in which is fastened a second anti-friction composite disc 60. The disc 60 is flat and bears against the upper bearing member 61 which may be smooth or antifriction coated. Thus, the central bearing member 58 can move omni-directionally with low friction on the lower bearing member 52 about the centroid C while simultaneously therewith the upper bearing member 61 can move omni-directionally in a plane with low friction relative to the disc 60.

The following central bearing member is secured in the lower bearing member 52 by a spring clip 62 that is received within recess 54 in the lower bearing member 52. Spring clip 62 prevents the floating central bearing member 58 from coming free of the fixed lower bearing member 52. The entire assembly is covered by a neoprene coated nylon boot 66 having a breather vent 67. The boot restricts entry of foreign matter into the vicinity of the friction surfaces. It will be recognized that the engaging contact surfaces of the upper, central or lower bearing members may be coated or impregnated with low friction material and one or both discs 56 or 60 eliminated.

Because there are frequent lateral as well as longitudinal motions between a truck and car body, it is considered essential that the anti-friction surfaces of the bearing be permitted to move in any rotational direction in order to maintain the compliance of the upper floating casting surface with the underside of the car body plate 61 at all times. The side bearings further permit the transmission of all load from the car body to be directly made into the side frames without any cushioning arrangement to weaken the structural viability of the entire system. As most clearly shown in FIG. 9, the common centroid C of the mating concave-convex contact surfaces of the central and lower bearing members 58 and 52 is positioned centrally within the side frame 40 such that all vertically applied loads are resolved to a location within side frame 40. Preferably, the centroid C is located not only in alignment with the longitudinal center axis of the transverse torsional member 49 but also vertically on its center axis; however, the centroid C may be located above the longitudinal axis of member 49 in order to maximize the curvature of the concave-convex contact surfaces without uneconomically increasing the size of the central bearing member 58. The selected range of coefficient of friction, which can be varied depending on the type of material used for the anti-friction composite disc, also provides important friction damping for the car body system, which is of great value in terms of decreasing or eliminating truck shimmy or hunting. With the side bearings close to the side sills of the car body, the latter sills must carry the forces, and thus, bending moments in the body bolsters are reduced, allowing the use of the side sills to carry almost the entire vertical load without the necessity of transmitting any of that load to the center sill.

Figures 11, 12, 13B, 13C:
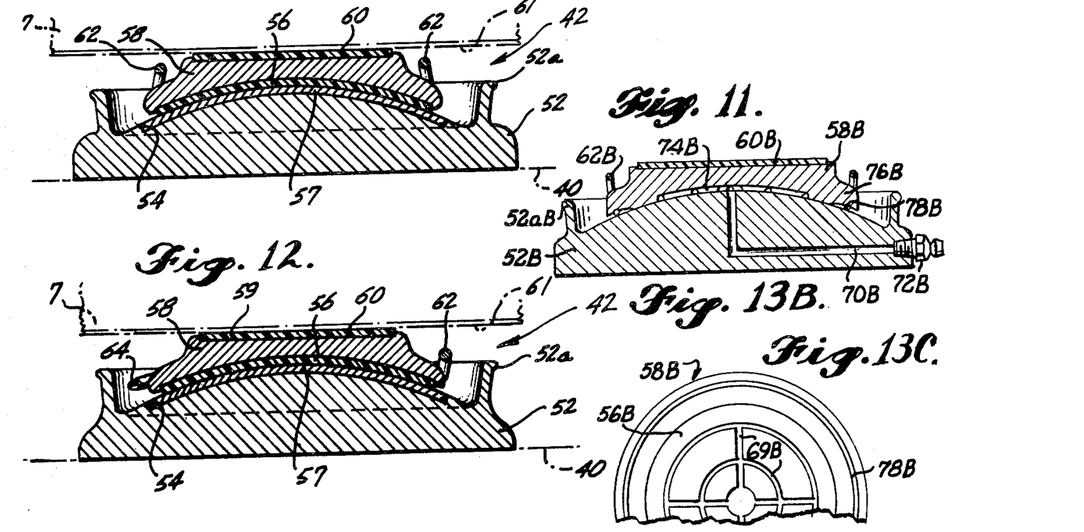

FIG. 13A illustrates an alternative form of side bearing. In this embodiment a lower member or casting 52A is provided with an upwardly facing concave seat 54A on which is positioned a circular bearing race 57A which holds a plurality of ball bearings 56A. A floating central member or round casting 58A rests on the bearings and is provided with an upper recess having the anti-friction composite disc 60. The disc 60 supports a polished plate 61 on the car body bolster 7 as in the preferred embodiment. FIGS. 13B and 13C illustrate an additional form of the side bearing of this invention which is generally similar to the side bearing in FIGS. 8–12 (like parts are designated with like reference numerals and the suffix letter B) except that the lower concave surface of the floating central bearing member 58B is interrupted to form an annular land 56B, as shown (FIG. 13C). The undersurface of land 56B is generally arcuate in cross-sectional configuration and mates with the surface of the convex domed midsection of the lower bearing member 52B. Preferably, these mating concave-convex surfaces are of the same generally hemispherical cross-sectional outlines projected at substantially the same radii from a common centroid C, such that the central bearing member can move omni-directionally on the lower bearing member about the centroid of the lower bearing member domed midsection, as is the case of the side bearing of FIGS. 8–12.

A grease passage 70B is formed in the body of the lower member 52B and terminates at its outer end in an external grease fitting 72B. The inner end of the grease passage 70B communicates with the cavity 74B which is formed between the underside of the central member 58B and the domed midsection of the lower member 52B. As most clearly shown in FIG. 13C, the undersurface of the central bearing member includes grease grooves 69B which are arranged concentrically and radially about the center of cavity 74B. These grooves serve to channel and evenly distribute grease which is injected into the center point of the cavity 74B through the grease passage 70B. Thus, it is possible, by introducing lubricant at the center point of cavity 74B and allowing it to flow downwardly by gravity between the convex-concave bearing surfaces of the lower and central bearing members, to achieve long lasting and uniform lubrication. Central bearing member 58B includes a peripheral lip 76B, the undersurface of which mounts an O-ring wiper seal 78B. This seal removes dirt and contaminants from the load bearing surfaces. To provide low friction movement of the central bearing member relative to the lower bearing member, the lower surface of land 56B, or the surface of the lower bearing member domed mid-section, or both such surfaces are smooth; however, it will be recognized that one or both of these surfaces may be coated, or impregnated with, or support a composite of teflon or other well-known low friction materials.

The modified side bearings of FIGS. 13A–13C each provides the same onmi-directional vertically incompressible side bearing support as in the first preferred embodiment of FIGS. 8–12; but because of steel bearing support will be capable of carrying greater loads than that of the first preferred embodiment.

As is evident, the side bearing embodiment on FIG. 13A has a concave lower member, as opposed to a convex lower member of the first preferred embodiment of FIGS. 8–12. Obviously, lower member of the side bearings of FIGS. 8–12, or the FIGS. 13B and 13C, can also be concaved. Further, other satisfactory alternate configurations will be apparent to one skilled in the art, such as forming the plate 61 concave, convex, etc., so long as the vertically incompressible omni-directional conditions described above are satisfied such that vertically applied loads are resolved to locations within the side frames.

Figure 14:
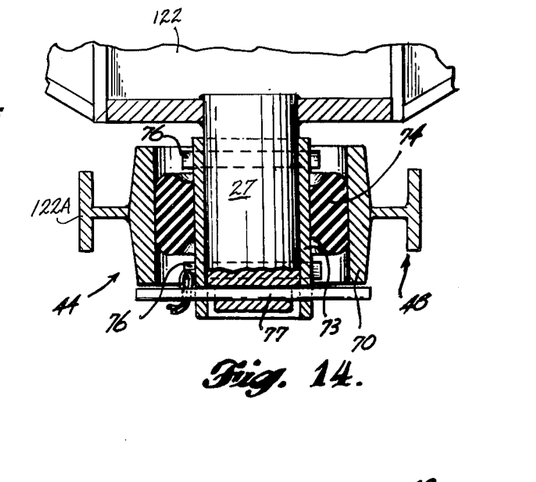
FIG. 14 is a transverse section through the center pin.
Figure 15:
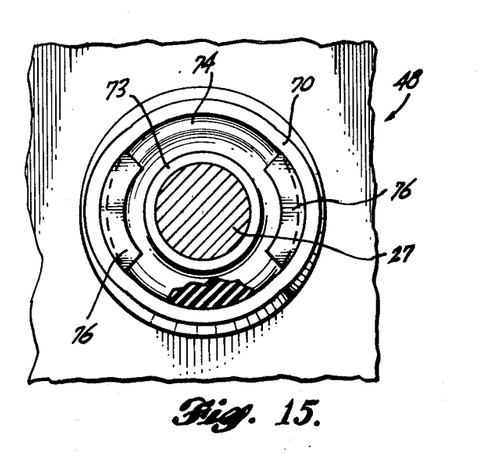
FIGS. 15, 16 and 17 are operational schematic views illustrating the single spring-rate, lateral compliance and the variable two spring-rate, longitudinal compliance of the center spring.
Figure 16:
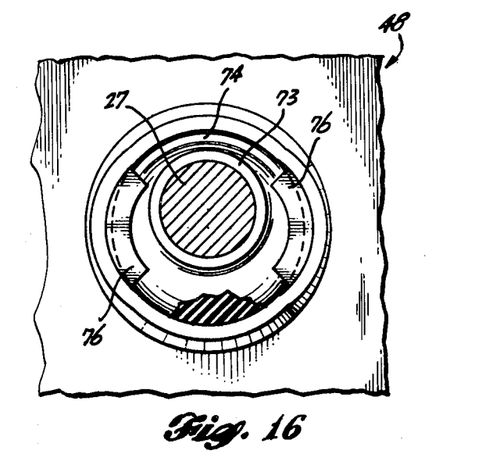
Figure 17:
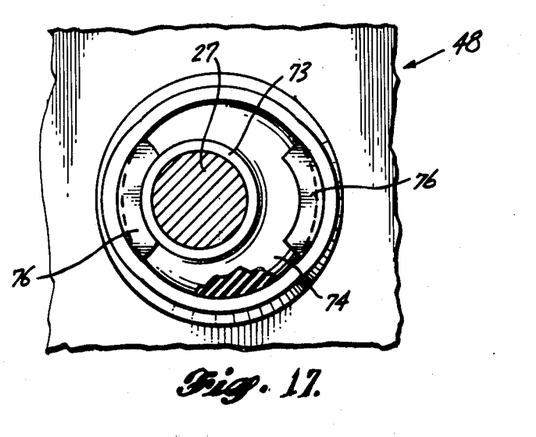
Figure 18:
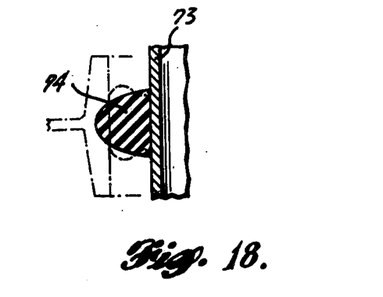
FIG. 18 is a schematic transverse section of a portion of the center pin of FIG. 13, with the elastomer relaxed.

Along with the frictional damping of the omni-directional bearing 42, the rock-and-roll motion and other aforementioned dynamic forces have also been shown to be reduced by the use of a compliant center mounting. As best shown in FIGS. 13–18, the center of the truck transverse member 48 is provided with an elliptical ring 70 (this may be a metal, circular ring). The center pin 27 is surrounded by a sleeve 73 which is held on the center pin 27 by a tapered pin 77, as shown in (FIG. 14). An elastomer 74 surrounds and is bonded to sleeve 73. The elastomer 74 has a minimym modulus of elasticity in the range of 800 to 1600 psi tensile at 300% elongation, and preferably minimym 1000–1200-psi tensile at 300% elongation for a truck capacity of nominally 35 tons. The elastomer 74 is generally parabolic in cross-section when relaxed, as best shown in FIG. 18, and is precompressed when installed an amount slightly greater than the maximum deflection in use. Consequently, maximum deflection will still provide wall contact with the rubber on the trailing side of the elastomer. The elastomer precompression during initial installation changes the shape to that shown in FIG. 14. The parabolic, relaxed shape and precompression allow the use of a lower spring-rate elastomer while assuring full elastomer contact with the ring 73 under all deflections. The forward and rear ends of the elliptical or circular ring 70 may have bonded thereto a stiffer elastomer or shock pads 76. The shock pad location provides a two spring-rate variable spring in the longitudinal direction only. Steel shock pads may also be employed to provide a more rigid stop. Fig. 15 shows the center pin shifted laterally. FIG. 17 shows the center pin shifting longitudinally and bringing into play the second spring 76, or stop, in the case of the steel pad. Thus it can be seen that a soft spring rate can be provided for lateral loads, whereas the soft spring can be increased to a stiff spring or stops to prevent over-compression of the elastomer under the greater shock loads in the longitudinal direction, such as when cars hit one another.

Figure 24:
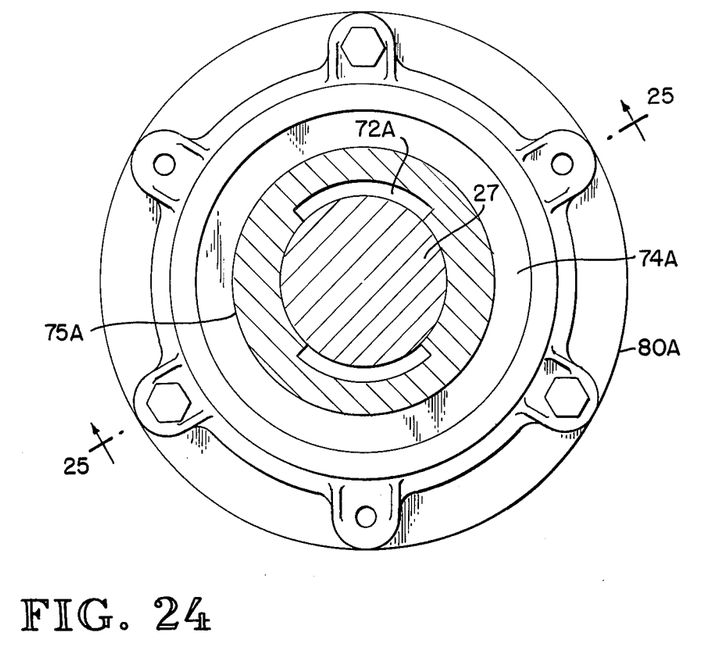
FIG. 24 is a horizontal section of a modified spring center pin.
Figure 25:
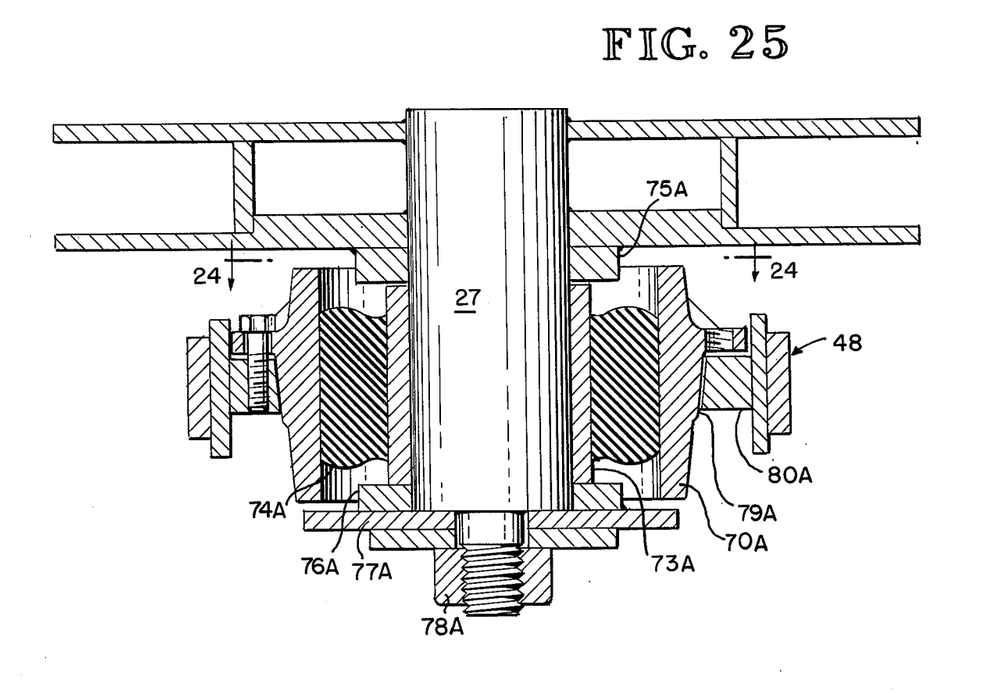
FIG. 25 is a section taken along the line 25—25 in FIG. 24.

A preferred form of sprung center pin is illustrated in FIGS. 24 and 25. In this embodiment, the center of the transverse member 48 is provided with a cylindrical ring 70A. The center pin 27 is again surrounded by a sleeve 73A on which is bonded an elastomer 74A having modulus of elasticity in the range of 800–600 and preferably 1000–1200. Sleeve 73A is interconnected by spines 72A with pin 27. The elastomer 74A is generally parabolic as in the embodiments earlier described. In the preferred embodiment of FIGS. 24 and 25, a pair of upper and lower stop rings 75A and 76A are secured around the pin 27 to engage the ring 70A during maximum impact conditions and thus prevent over stressing of the elastomer 74A. Stop ring 76A is connected to a plate 77A which is secured to pin 27 by a nut 78A. The plate 77A prevents accidental vertical movement of the pin. A unique feature of the center pin is that the sleeve 73A, elastomer 74A and ring 70A can be removed and replaced as a unit quickly without requiring an extensive disassembly of the individual parts. For this purpose, the ring 70A is provided with a beveled guide surface 79A which sits in a beveled ring 80A secured to the transverse member 48. The total unit, however, centers itself when assembled for quick installation.

In both center pin spring embodiments of FIGS. 13–18 and 24–25, the elastomer is permanently secured as by bonding to the pivot pin sleeve and thus moves therewith. The distal end of the elastomer is bonded and held by precompression against ring 70 or ring 70A. As a result, relative rotation between the car body and member 48 will be self-centering so as to return the car body to its original alignment above the truck after the rotation causing forces are removed.

The combination of friction damping of the side bearing and the damping and sprung movement at the center pin provides both a sprung and damped rotational movement with total resistance to rotation being about the same as or less than is encountered with conventional, semi-lubricated or dry center plate, car-truck construction. As is readily apparent, no vertical load is transmitted to the truck at the center pin but all horizontal loads are taken at this point. The side bearing support of the car body and precompression of the main load suspension elements of the truck maintain the car body on the side frames, even to the point of overturn of the railcar. Another function of the elastomer spring ring is to maintain the center of rotation of the body on a theoretical longitudinal axis through the transverse center of the axles in the case of rock-and-roll motion. This occurs due to the compliance of the elastomer which allows the center point to shift laterally rather than merely rock. In other words, the elastomer reduces the lateral forces tending to overturn the car body. Since the side bearings hold the center pin in a perpendicular alignment with the lengthwise axis of the transverse member 48, only horizontal movements are absorbed by the elastomer, thus reducing random extraneous torsional forces on the transverse member, resulting in longer life for the transverse member.

As best shown in FIGS. 19–23, a suspension system is illustrated for use in the railcar truck. The truck includes a side frame 120 like side frame 40 only for a single axle as in FIG. 1 and having a suspension housing 82. Centrally positioned in the housing is a wheel axle 2 having a conventional roller bearing 5 and a wheel 1.

Figure 19:
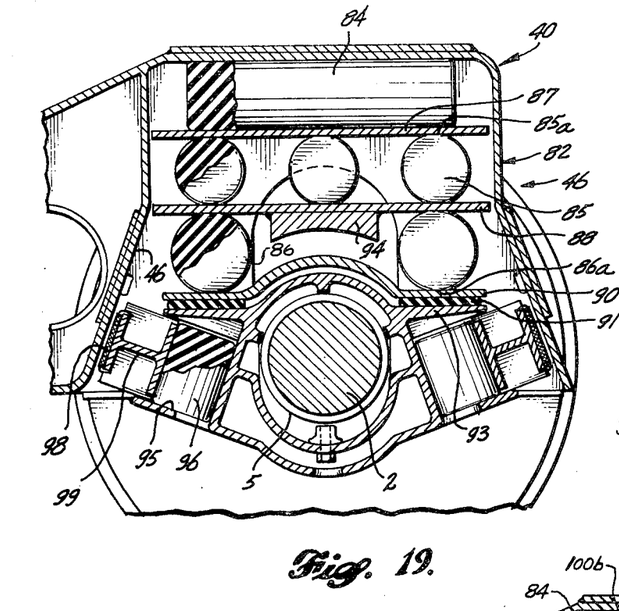
FIG. 19 is a side elevation, with parts broken away, of the spring and damping suspension system shown in the embodiment of FIG. 1.
Figures 20, 22, 23:
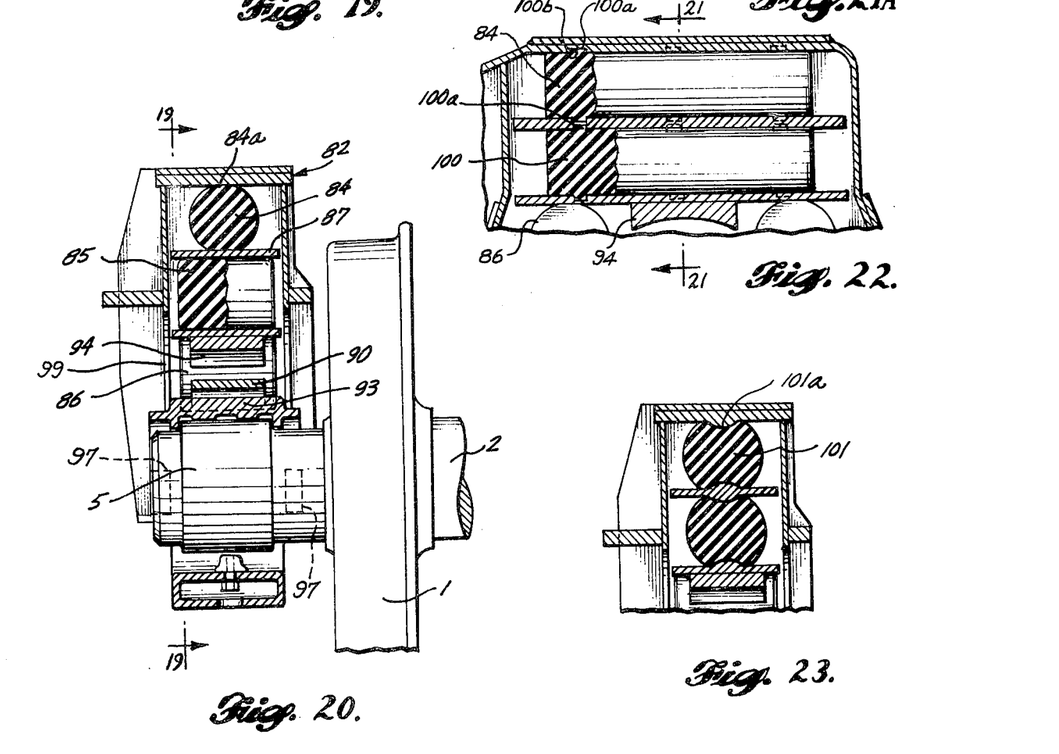
FIG. 20 is a transverse section of the suspension system shown in FIG. 19.
FIG. 22 is a longitudinal section of the modification shown in FIG. 21.
FIG. 23 is a transverse section of still another modified form of spring arrangement.
Figure 21:
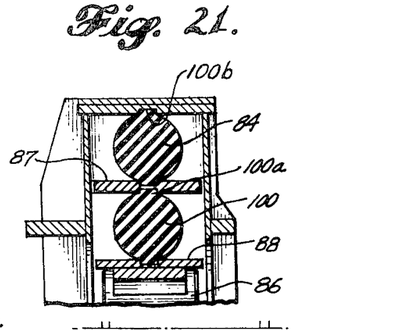
FIG. 21 is a transverse section of a modified spring arrangement.
Figure 21A:
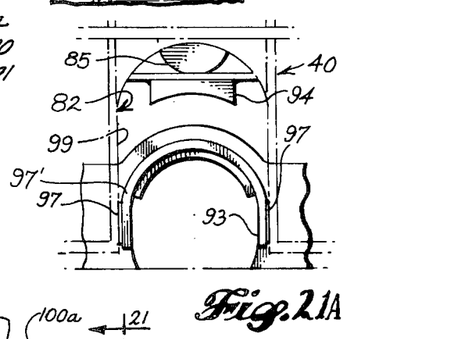
FIG. 21A is a fragmentary side elevation as viewed looking from the left in FIG. 20.

Within the housing is a vertical stack of generally cylindrical spring elements designated as 84, 85 and 86. The top spring element 84 abuts against the top surface of the suspension housing and lies on a horizontal spacer plate 87. The center axis of the spring element 84 lies in a longitudinal direction. The upper and lower surfaces of the spring element are provided with flats 84a. The second tier of spring elements 85 is also provided with flats 85a at top and bottom and includes three such elements, one centered over the axle 2 and the others spaced equidistantly on either side of the axle. The spring elements abut against the spacer plate 87 and a second, lower spacer plate 88. Finally, the lowermost spring elements 86 are two in number, transversely located and equidistantly spaced on either side of the axle. The elements 86 are also provided with upper and lower flats 86a and abut against the lower spacer plate 88 and a spacer plate 90. The spacer plate 90 is bonded to an elastomer pad 91 which mainly provides lateral spring return motion for the truck and railcar between the wheels and the side frames. The spring pad 91 is carried on a sub-housing carrier or adapter 93 which is mounted on the bearing 5. A bumper or stop 94 limits downward movement of the housing 82 to prevent over-compression of the spring elements 86, which would otherwise be possible because of their shape factor, i.e., diameter to length being less than the Natural Rubber Producers Research Association of London, England, recommended ratio of length much greater than diameter to compensate for end bulge effects and utilize the formula:

$$F/dE_o = 1.25(s/d)^{3/2} + 50(x/d)^6$$

F = load per unit length
d = cross-sectional diameter
x = compression
$E_o$ = Young's modulus The spring elements 86 (lowest tier) are designed to be the stiffest springs and are of a diameter of 5 ½ inches by 6 ½ inches in length for a nominal 70 ton truck. In use, the suspension is precompressed to the initial upper limit of the 3 inch travel allowed within the coupler vertical limits (preferably precompressed about 3 inches) and thus provides good spring effect even in the unloaded condition of the vehicle. The center tier of elements 85 is softer and is 5 inches in diameter by 6 ½ inches in length. The third or upper tier of elements is also a softer spring and is of a diameter of 5 inches by 18 ¼ inches in length. The relative sizes and shapes, however, will vary depending on the application.

Figure 13:
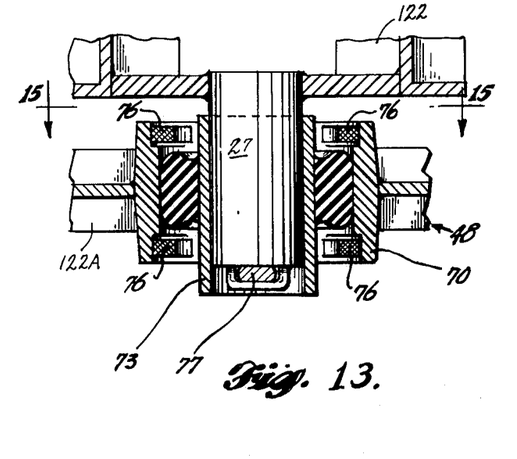
FIG. 13 is an elevation view taken on section line 13–13 through the center pin of the truck shown in FIG. 2.

In a preferred embodiment of the invention shown in FIGS. 11 and 13, there is an upper pair of rod spring elements 84 and 100 which are vertically spaced and arranged with their axes in the longitudinal direction. Each of these spring elements 84 and 100 has a generally cylindrical shape having a modulus of elasticity in the range of 800 to 1600 psi, and preferably 1000 to 1200 psi, at a tension modulus (tensile elongation) of 300% for a truck of nominal 70 ton capacity and a railcar empty weight of 88,000 lbs., 165,000 lbs., lightly loaded, and 220,000 lbs. fully loaded. The bottom tier of spring elements 86 has a higher modulus of elasticity in the range of 2000 to 2500 psi, and preferably 2200 to 2300 psi, at 300% tension modulus. These lower spring elements, although stiffer than the upper two layers, provide, to a large extent, the soft portion of the spring rate in the suspension system.

Compression with light lading in the car will allow the springs 86 to absorb some of the loads; but, for most if it, and all heavy lading, the upper spring elements come into play. It should be understood that the size, stiffness, number and arrangement of the springs are dependent upon the load capacity and type of application required; therefore, the examples are to be considered as illustrative only.

Although there is a certain amount of inherent internal damping in the spring elements, dependent upon the modulus of elasticity of the rubber used, it is insufficient to provide the total damping necessary for most conditions experienced by vehicles. As an example, a rubber having aprpoximately 15% internal damping in the embodiment illustrated may amount to less than 8% of the critical (effective) damping for the total system for an application which may require as much as 20% of critical damping. The additional required damping is obtained from a unique variable damping system again best illustrated in FIGS. 9 and 10 of the drawings.

The variable damping system of this invention varies with vertical distance on a varying exponential curve which is designed to closely match that of the main suspension spring elements and add cumulatively to the inherent damping of the main suspension spring elements. The varying exponential spring rate provides a slowly changing rate under low loads and a rapidly increasing rate in the upper load range.

The friction dampers of this invention also provide load-responsive, lateral damping for the lateral pad springs, where used. For this purpose, a horizontal lateral gap of about ¼ inch is provided on either side of the friction shoe 98 to allow lateral movement. In the damping system of this invention, preferably cylindrical elastomeric spring elements 96 (although volute or other variable rate springs can be used) are arranged in a pair of cylinders 95 spaced equidistantly from and on each side of the rotatable axis, in FIG. 9, the vehicle axis. A friction shoe element 98, of a conventional brake shoe-type material having a coefficient of friction of approximately .4, is pushed by a rectangular piston 99, which abuts against the cylindrical spring element 96, against a sloped surface 46 which is parallel to element 98. It can thus be readily recognized that lowering the housing 82, due to increased loads or dynamic forces acting on the car, will move the sloped surface 46 downwardly, sliding the sloped surface past the friction shoe 98 and compressing the spring elements. The greater the downward movement, the greater the outward force provided by the spring element 96 on the friction shoe, thus increasing the damping force applied through the system.

As is also readily apparent, the symmetric spacing of the friction shoes and spring elements balances the damping and springing moments on either side of the axle 2, thus reducing undesirable moments and tending to center the carrier at all times. It is, of course, understood that the angle of the sloped surface and/or the modulus of elasticity and shape of the spring element 96 can be varied to achieve the optimum damping configuration. Vertical guidance of the adapter 93 to prevent fore and aft movement of the wheels relative to the side frame is provided, first, by the friction shoes 98, and, under more severe loading, by replaceable steel wear plates 97, replaceable plates and mountings 97′ secured to the fore and aft surfaces of the adapter for engagement in the axle slot 99 of the side frame 40. Preferably, the damping is directly related to the spring force provided by the spring elements 84, 86 and 100. It is one of the advantages of this system that a unique relationship is established between the spring and damping forces such that both spring and damping forces increase at approximately the same rate under loading, dynamic or static. Thus, where loads are high, the spring force is high and the damping force is high, thus cushioning the shock to fragile light lading, such as fruit, in a refrigerator car.

In some instances, it is desirable to provide additional stability to the cylindrical spring elements, particularly when the generally cylindrical elements shown in FIGS. 9 and 10 are not stacked directly in alignment with one another. For this purpose, the modifications shown in FIGS. 11 and 13 are provided with bosses 100*a* that locate in recesses 100*b* of the plates 87 and 88. The bosses seated in the recesses provide locating and stability functions, as well as allowing ease of assembly and movement of the stacked springs to or from the housing 82. The bosses are spaced in from the longitudinal ends of the plates to minimize stress concentration at the ends of the elastomers.

In FIG. 14, still additional spring elements 101, of a different arrangement, are shown. In this embodiment, the flats are provided with recesses 101*a*. The shape of the spring element is a balance between the amount of rubber removed at top and bottom to provide economy of material plus proficiency of performance. The recess-type spring (still generally cylindrical) has basically the same volume as the more generally cylindrical spring. The shape of the curve of this modified form in cross-sectional quadrant is approximately the same as for 84 and 100. The shape in all the modified forms is quite important since too great a change from the generally cylindrical configuration changes the spring characteristics too severely to achieve the desired results.

While the spring element forms illustrated provide the best configurations, they are not to be considered as limiting. Furthermore, various flats can be added to assure a better bond (if required) to the spacer plates, and the ends of the generally cylindrical elements can be relieved to prevent high stress concentrations, provided they are not changed too drastically to preclude their meeting the requirements of shape factor, size, spring travel and desired variable spring rates necessary to a fully operative suspension system.

The car bodies 110 are also joined by a conventional drawbar or other coupling 112 and the trucks are joined with the unique automatic telescopic members 114 and 115 and the boot 116. The principles of operation are the same as those described for FIGS. 4 and 5, with the additional advantage of the improved spring and damping features.

When the interrelated trucks and cars are connected for normal running, as shown in FIGS. 6 and 7, they have two distinct characteristics which distinguish them from any other system of articulation. One is that the telescopic interconnection between the trucks has no longitudinal tension or compression strength of itself. There is simply an interconnecting, rotatable member telescoping inside another such member to allow longitudinal and rotational free movement dynamically while resisting bending, laterally or vertically. All forces taken by pulling or pushing or impacting the combined railcar bodies and trucks are through the car body structure and its structural interconnecting means, such as by semi-permanent drawbars or other conventional coupler means, with or without conventional draft gears.

The telescopic member connected to the trucks independently of the conventional drawbar takes no compression or tension, but rather, is allowed to dynamically slide in or out relative to the position of the car bodies described above and the car interconnecting drawbar without getting into toggle.

Another main advantage of the combined system is that, when the vehicles are separated, they always have at least four wheels per vehicle to allow them to be pulled or pushed along the track to make up new interconnected railcar trains or for shop servicing purposes. The adjacent two-wheeled trucks of two cars, when coupled together, form a forward four-wheeled truck in front and a four-wheel truck in the rear, each having four wheels acting as a single unit to provide wheel guidance to all four wheels of the adjacent two-wheeled trucks. Forming the two-wheeled trucks into combined four-wheeled trucks gives the performance characteristics of the double-axle truck described earlier. Since the telescoping members are free to rotate one with the other using anti-friction means to assure that both rotation and longitudinal movement are freely accomplished without resistance, the trucks are allowed to "walk," as required by track variations mentioned previously. The use of this unique, interconnected, single-axle truck also reduces the cost of both the initial outlay and maintenance by reducing the number of axle and wheel sets required for any given train length and, by reducing deadweight, reduces fuel consumption.

While preferred forms of the invention have been illustrated and described, variations will be apparent to those skilled in the art without departing from the principles herein described. Accordingly, the invention is not to be limited to the specific embodiments illustrated.

The embodiments of the invention in which a particular property of privilege is claimed are defined as follows:

1. An articulated railcar unit, comprising: two car bodies having ends; forward and rearward trucks pivotally mounting the forward and rearward ends of said two car bodies, respectively, to swivel independently thereof, the forward truck assciated with one car body having a single axle, the rearward truck associated with the other car body having a single axle; means acting between the forward end of the one car body and the rearward end of the other car body for transmitting pushing and pulling forces therebetween; and means acting between said forward and rearward single axle trucks for maintaining their axles in parallel alignment while permitting relative longitudinal movement of said single axle trucks when negotiating curved track.

2. The unit of claim 1, wherein said means acting between said forward and rearward single axle trucks are further operable to permit said trucks to rock relatively about a longitudinal axis therebetween.

3. The unit of claim 1, wherein each of said trucks includes suspension means providing vertical load support for the respective railcar body at two transversely spaced apart vertical load support points.

4. The unit of claim 1, wherein each of said single axle trucks further comprises two parallel side frames; side bearing means mounted by said side frames for vertical load bearing connection to a car body at two transversely spaced apart vertical load support points such that applied vertical loads are resolved to respective locations within said side frames while simultaneously therewith providing omni-directional damped movement of the car body in a generally horizontal plane; and center pin means mounted between said side frames for horizontal load bearing connection to a depending car body pivot pin adjacent a pivot axis about which the car body and truck unit can swivel relatively while simultaneously therewith providing omni-directional sprung and damped movement of the car body pivot pin in a generally horizontal plane.

5. The unit of claim 1, wherein each of said single axle trucks includes two parallel side frames, and suspension means for supporting said side frames in relation to said axle, said suspension means including two suspension units respectively supporting said side frames from the end portions of said axle, each suspension unit including a carrier supported by said axle, a housing secured to and movable vertically with a respective side frame relative to said carrier, elastomeric spring means supporting said housing from said carrier and applying a variable rate spring force to said housing in response to downward movement of said housing produced by application of a downward load to the respective side frame, and damping means applying a variable rate damping force to said housing simultaneously with application of said spring force in response to downward movement of said housing produced by application of a downward load to the respective side frame, said spring and damping means being carried by said carrier in a symmetrical relationship to the rotational axis of said axle.

6. The unit of claim 5, wherein said elastomeric spring means of each suspension unit includes a plurality of elastomeric spring elements, each including an elongated solid body of elastomeric material having curved sides, said spring elements being carried by said carrier and arranged in vertical tiers such that they are compressed transversely to their longitudinal axes in response to downward movement of said housing.

7. The unit of claim 5, wherein said damping means of each suspension unit includes an inclined friction surface formed by the respective housing, and friction shoe means carried by said carrier for exerting frictional effort upon said friction surface in response to downward movement of said housing, said friction shoe means including a friction shoe carried by said carrier and engageable with said friction surface, and an elastomeric spring element for urging said shoe into engagement with said friction surface, said spring element including an elongated solid body of elastomeric material having curved sides and arranged between said carrier and said friction shoe such that it is compressed transversely to its longitudinal axis in response to movement of said friction shoe produced by engagement thereof with said friction surface.

8. A double axle railcar truck system which comprises two trucks, each including a single axle, means for swivel mounting one single axle truck to an overhead railcar body, means for swivel mounting the other single axle truck to another railcar body, and means acting between said trucks for maintaining their axles in parallel alignment while permitting relative longitudinal movement of said trucks when negotiating curved track.

9. The truck system of claim 8, wherein said means acting between said trucks are further operable to permit said trucks to rock relatively about a longitudinal axis therebetween.

10. The truck system of claim 8, wherein each of said trucks includes suspension means providing vertical load support for the respective railcar body at two transversely spaced apart vertical load support points.

11. The truck system of claim 1, wherein each of said trucks further comprises two parallel side frames; side bearing means mounted by said side frames for vertical load bearing connection to a car body at two transversely spaced apart vertical load support points such that applied vertical loads are resolved to respective locations within said side frames while simultaneously therewith providing omni-directional damped movement of the car body in a generally horizontal plane; and center pin means mounted between said side frames for horizontal load bearing connection to a depending car body pivot pin adjacent a pivot axis about which the car body and truck unit can swivel relatively while simultaneously therewith providing omni-directional sprung and damped movement of the car body pivot pin in a generally horizontal plane.

12. The truck system of claim 8, wherein each of said trucks includes two parallel side frames, and suspension means for supporting said side frames in relation to said axle, said suspension means including two suspension units respectively supporting said side frames from the end portions of said axle, each suspension unit including a carrier supported by said axle, a housing secured to and movable vertically with a respective side frame relative to said carrier, elastomeric spring means supporting said housing from said carrier and applying a variable rate spring force to said housing in response to downward movement of said housing produced by application of a downward load to the respective side frame, and damping means applying a variable rate damping force to said housing simultaneously with application of said spring force in response to downward movement of said housing produced by application of a downward load to the respective side frame, said spring and damping means being carried by said carrier in a symmetrical relationship to the rotational axis of said axle.

13. The truck system of claim 12, wherein said elastomeric spring means of each suspension unit includes a plurality of elastomeric spring elements, each including an elongated solid body of elastomeric material having curved sides, said spring elements being carried by said carrier and arranged in vertical tiers such that they are compressed transversely to their longitudinal axes in response to downward movement of said housing.

14. The truck system of claim 12, wherein said damping means of each suspension unit includes an inclined friction surface formed by the respective housing, and friction shoe means carried by said carrier for exerting frictional effort upon said friction surface in response to downward movement of said housing, said friction shoe means including a friction shoe carried by said carrier and engageable with said friction surface, and an elastomeric spring element for urging said show into engagement with said friction surface, said spring element including an elongated solid body of elastomeric material having curved sides and arranged between said carrier and said friction shoe such that it is compressed transversely to its longitudinal axis in response to movement of said friction shoe produced by engagement thereof with said friction surface.

* * * * *